United States Patent [19]

Kawahigashi et al.

[11] Patent Number: 5,656,371

[45] Date of Patent: Aug. 12, 1997

[54] INSULATING COMPOSITION AND FORMED ARTICLE THEREOF

[75] Inventors: Masaki Kawahigashi; Hiroshi Kato, both of Amagasaki; Ryuichi Sugimoto, Takaishi; Nobutaka Uchikawa, Chiyoda-ku; Katsumi Yoshino, Kishiwada, all of Japan

[73] Assignees: Mitsubishi Cable Industries, Ltd.; Mitsui Toatsu Chemicals, Inc., both of Japan

[21] Appl. No.: 495,792

[22] Filed: Jun. 27, 1995

[30] Foreign Application Priority Data

| Jun. 27, 1994 | [JP] | Japan | 6-144961 |
| Jun. 27, 1994 | [JP] | Japan | 6-144964 |
| Jun. 27, 1994 | [JP] | Japan | 6-144969 |
| Jun. 27, 1994 | [JP] | Japan | 6-144971 |
| Jun. 27, 1994 | [JP] | Japan | 6-144973 |
| Jun. 27, 1994 | [JP] | Japan | 6-145089 |
| Jun. 27, 1994 | [JP] | Japan | 6-145092 |
| Jul. 6, 1994 | [JP] | Japan | 6-154073 |
| Jul. 8, 1994 | [JP] | Japan | 6-157046 |

[51] Int. Cl.$^6$ .............................. H01H 3/30; H01H 9/00; H01H 11/00
[52] U.S. Cl. .............................. 428/375; 156/47; 156/51; 428/392
[58] Field of Search .............................. 524/582; 156/51; 428/375, 500, 461

[56] References Cited

U.S. PATENT DOCUMENTS

| 4,673,620 | 6/1987 | Shulman et al. | 428/521 |
| 5,270,410 | 12/1993 | Job | 526/351 |
| 5,455,305 | 10/1995 | Galambos | 525/240 |
| 5,525,675 | 6/1996 | Masuda et al. | 525/193 |

OTHER PUBLICATIONS

*Patent Abstracts of Japan*, 17(42) (C-1020) (abstract of JP 04-258645) (1992).
*Patent Abstracts of Japan*, 17(42) (C-1020) (abstract of JP 04-258644) (1992).
*Chemical Abstract*, 106(12), abstract No. 91266 (1987).

*Primary Examiner*—Tae Yoon
*Attorney, Agent, or Firm*—Wenderoth, Lind & Ponack

[57] ABSTRACT

An insulating composition comprising a syndiotactic polypropylene (s-PP) having a syndiotactic pentad ratio of not less than 0.7 and an MFR of 0.05–2.0 g/10 min. The composition of the present invention comprising a specific s-PP can provide an article having superior electric properties and mechanical properties. In particular, the article can retain superior electric properties and mechanical properties even after rapid cooling or gradual cooling for re-processing of said article. Accordingly, the composition of the present invention can be suitable used for insulating layer, coating layer of various power cables inclusive of high voltage wires and low voltage wires, coating layer of optical fibers and insulator of wire-connecting structures.

14 Claims, 1 Drawing Sheet

INSULATING COMPOSITION AND FORMED ARTICLE THEREOF

FIELD OF THE INVENTION

The present invention relates to an electrically insulating composition and a formed article inclusive of an insulator formed from said composition. More particularly, the present invention relates to an insulating composition comprising a syndiotactic polypropylene and formed articles thereof.

BACKGROUND OF THE INVENTION

An isotactic polypropylene (hereinafter also referred to as i-PP) conventionally used as an insulating material is inherently rigid and subject to limitation when used as a bulky material for electrical insulation. It is often inadequate, moreover, in terms of rigidness and brittleness (susceptibility to occurrence of cracks), when formed into a thin sheet or a composite with other materials.

A low density polyethylene (LDPE) and ethylene propylene rubber (EP rubber) may be also used as an insulating material for general use. Yet, there remains a demand for an insulating material having higher electrical properties and physical properties, and formed articles including insulators formed therefrom.

The conventional insulating layer and coating layer for cables are associated with various problems to be noted below.

A low density polyethylene conventionally used as an insulating composition for power cables has a low melting temperature, which can possibly result in deformation of an insulator when the cable is energized and the conductor is heated thereby. To prevent this, polyethylene is mostly crosslinked (e.g. chemical crosslinking). The biggest problem in producing a power cable which requires such crosslinking step is the longer production time necessary for crosslinking reaction.

One of the polymers capable of overcoming this problem is polypropylene which is the same polyolefin as polyethylene. However, the i-PP currently on the market has poor flexibility and low electric breakdown property to the extent that frequent use thereof as a cable insulating composition is rare.

Accordingly, a polymer having a sufficiently high melting temperature, superior electric breakdown property even without crosslinking, and flexibility required of a cable insulating material is needed as an insulating material to solve the above-mentioned problems. In particular, the polymer is required to have superior electric breakdown property at high temperatures, since the cable insulator reaches about 70° C. due to the heating of the conductor during operation.

As an insulating material for low voltage electric wires such as wires for equipments, specifically for underwater motors, a blend of isotactic polypropylene/ethylene propylene rubber (hereinafter also referred to as i-PP/EP rubber) has been conventionally used.

A low voltage electric wire comprising an insulating material of the above-mentioned i-PP/EP rubber is poor in resistance to underwater breakdown and cut-through property and is problematic. That is, a low voltage electric wire comprising an i-PP/EP rubber easily develops insulation breakdown when used in water for an extended period of time, and is vulnerable to external damages.

Conventionally used as an insulating layer of power cables is LDPE. When it is used for high voltage cables of 6.6 kV or above, for example, the temperature of the cable elevates due to heating caused by the electric resistance of the conductor, which can possibly cause softening of an LDPE insulating layer. For this reason, a crosslinked LDPE (XLPE) imparted with enhanced heat resistance by crosslinking LDPE is generally used as an insulating layer of high voltage power cables. A chemical crosslinking using an organic peroxide is most frequently employed for this end.

On the other hand, a high voltage power cable requires inner semiconductor layer and an outer semiconductor layer formed on the both sides of an insulating layer to relax the electric field. These inner and outer semiconductor layers are, like the aforementioned LDPE, generally crosslinked for improving heat resistance, and the crosslinking is performed simultaneously with the crosslinking of insulating layer.

The crosslinking requires high temperature and a long reaction time, thus markedly restricting the production efficiency of high voltage power cables.

Communication cables generally comprise a foamed insulating layer of, for example, a high density polyethylene (hereinafter referred to as HDPE) to cover and protect a conductor for the purpose of reducing noises.

When a foamed layer is formed from HDPE, the layer often has a less void ratio (hereinafter referred to as expansion ratio) in HDPE than desired and fails to achieve uniform foaming, which in turn results in insufficient action of the foamed layer to reduce occurrence of noises.

In addition, a low expansion ratio increases dielectric constant, which leads to the absorption of electric energy by the foamed layer, causing attenuation of communication signals and low transmission efficiency.

While a foam of HDPE having an expansion ratio of 20–30% is rather easy to manufacture, in general terms, a highly foamed article having an expansion ratio of 50% or more is difficult to manufacture. Consequently, the foam may have poor mechanical properties such as flexibility and cannot serve well as an insulating layer of communication cables.

As flame-resistant cables, there have been conventionally known those having a flame-resistant layer composed of a flame-resistant composition comprising a high polarity flame retardant such as decabromophenyl ether or magnesium hydroxide [$Mg(OH)_2$] and a base polymer such as HDPE. Such flame-resistant cable is defective in that mechanical properties drastically fall due to the above-mentioned flame retardant which needs to be added in a large amount to impart high flame resistance to the flame-resistant layer.

Optical fibers are vulnerable to damages, cracks, hitting and the like due to the external mechanical force such as bending and deformation during preparation, transport, installation and storage. So as to protect the optical fibers from such external mechanical force, for example, a resin jacket is formed directly on a cladding layer or via a primary layer. Known as such primary layer are, for example, ultraviolet (UV) curing epoxyacrylate resin and thermosetting silicone resin, and known as a jacket (secondary coating) is polyamide. The above-mentioned primary layer tends to develop pin-holes during curing. Presence of pin-holes in the primary layer results in inconsistent clamping of optical fiber, which in turn causes distortion of the optical fiber and increase in transmission loss. In addition, the above-mentioned jacket shrinks when cooled to a low temperature and bends optical fiber to cause increase in transmission loss. Moreover, the jacket is rigid, posing problems in terms of physical properties against stretching and bending.

The material for protecting electric wires, such as for sheath and jacket, is, for example, polyvinyl chloride (PVC) and HDPE. However, PVC requires relatively great amounts of plasticizer to improve processability and to impart flexibility. The plasticizer bleeds out when in use and adheres to or permeates into a semiconductor in an insulated portion to possibly affect the insulating property by increasing resistance. In addition, HDPE has poor environmental stress cracking resistance property (ESC resistance) due to the high crystallinity it has.

The polymer forming the insulating portions of a structure connecting electric wires is LDPE. Therefore, EMJ (extrusion mold joint) and BMJ (block mold joint) necessitate crosslinking of polyethylene to prevent thermal deformation of the insulator during power transmission, which crosslinking lengthens the production time. With regard to TMJ (tape mold joint) in the event a non-crosslinked material is used, it is associated with problems of cold flow and residual gap attributable to tape winding; and when a crosslinkable material is used, it is associated with a problem in that production time becomes longer. Moreover, PJ (prefabrication joint) is associated with a problem that the epoxy resin, a material constituting an insulating tube, weighs much.

Thus, a wire-connecting structure capable of overcoming the above-mentioned problems has been demanded.

SUMMARY OF THE INVENTION

It is therefore an object of the present invention to provide an insulating composition capable of solving various problems that the insulating layer and coating layer of conventional cables have.

Another object of the present invention is to provide an article formed from the above-mentioned composition.

With an aim of achieving the above-mentioned objects, various materials have been studied as to the applicability as insulating materials. As a result, a syndiotactic polypropylene (hereinafter also referred to as s PP) was found to possess higher electric properties than the conventionally-used insulating materials (e.g. LDPE and EP rubber), to be superior to i-PP in crack resistance and property retention after forming, as demonstrated by less changes in electrical properties and mechanical properties caused by rapid cooling after forming, and to have practically satisfactory flexibility when formed into an insulator.

Accordingly, the present invention provides an insulating composition comprising a syndiotactic polypropylene having a syndiotactic pentad ratio of not less than 0.7 and an MFR (melt flow rate) of 0.05–20 g/10 min, particularly 0.1–20 g/10 min, and to an article formed from said composition.

DETAILED DESCRIPTION OF THE INVENTION

Figure 1:
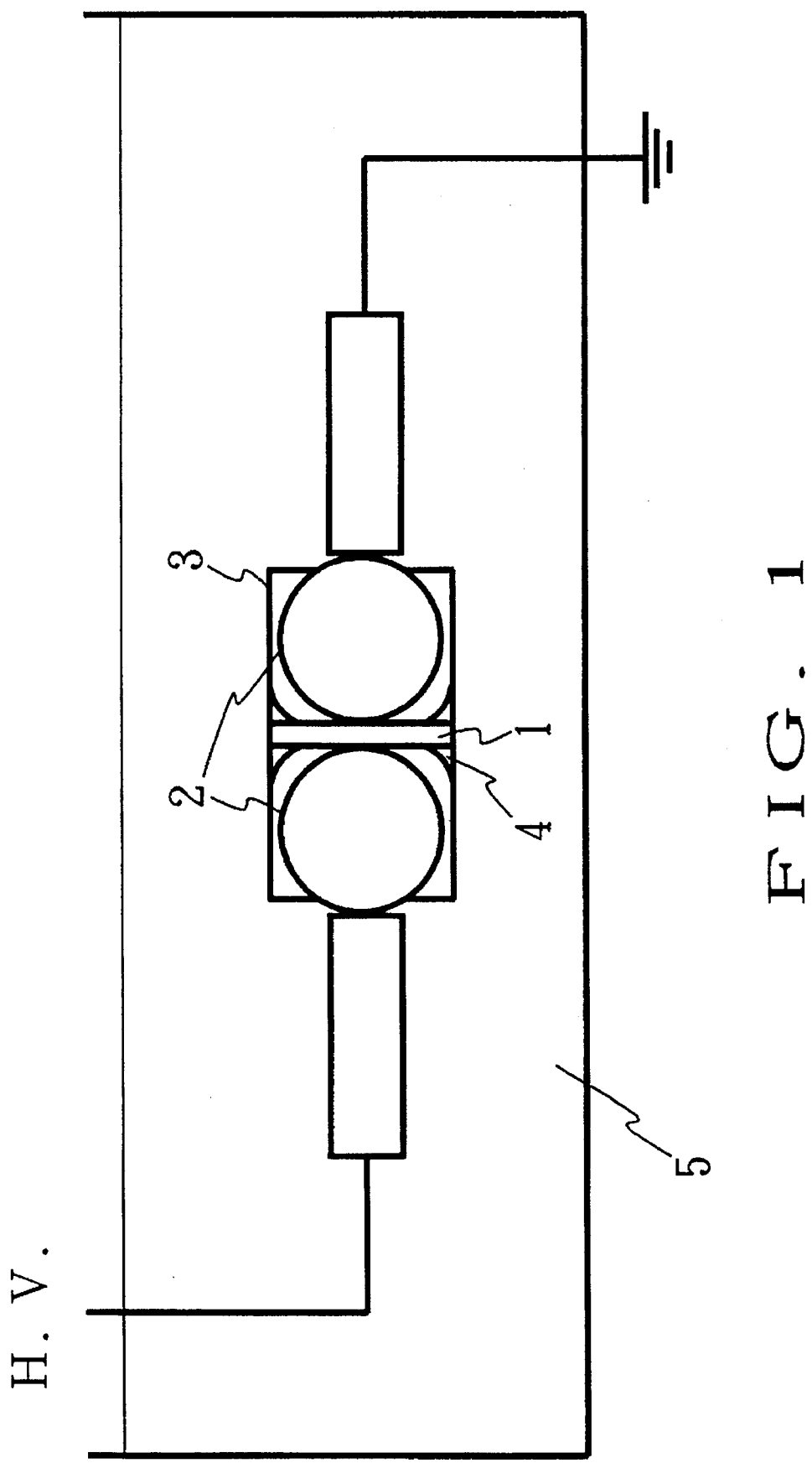
FIG. 1 shows an electrode for impulse breakdown test, wherein 1 is a specimen (thickness: 0.3 mm), 2 is 25 mm$\phi$ steel sphere, 3 is a polyethylene fuselage, 4 is an epoxy resin and 5 is a silicone oil.

The s-PP used in the present invention includes not only homopolymer of polypropylene having a syndiotactic structure but copolymers of such propylene and other olefins, and s-PP includes said copolymers in the description to follow. In the present invention, s-PP which is a homopolymer is preferable.

In the present invention, s-PP preferably has a weight average molecular weight of 3,000–400,000, more preferably 10,000–200,000.

It is essential that the s-PP in the present invention have a syndiotactic pentad ratio of not less than 0.7.

By a syndiotactic pentad ratio is meant the ratio of the peak intensity measured at 20.2 ppm based on tetramethylsilane (peak intensity of methyl group which is ascribed to syndiotactic pentad in polymer chain) to a peak intensity ascribed to the total methyl group in propylene units, in the $^{13}$C-NMR spectrum determined at 67.8 MHz in a 1,2,4-trichlorobenzene solution at 135° C.

The s-PP having a syndiotactic pentad ratio of less than 0.7 has a low melting temperature, poor electric breakdown strength, poor flexibility, inferior toughness and poor mechanical properties, which is not desirable for an insulating composition of the present invention.

The above-mentioned syndiotactic pentad ratio is preferably 0.8–0.95, from the aspects of resistance to electric field, processability, electric breakdown strength, mechanical properties, flexibility, extrusion coating performance, cold resistance and brittle resistance, and more preferably 0.86–0.95 from the aspect of processability.

The s-PP needs to have a melt flow rate (MFR) as defined by ASTM-D-1238, at load 10 kgf and temparature 230° C., of 0.05–20 g/10 min.

An s-PP having an MFR exceeding 20 g/10 min shows too great a flowability at high temperatures and an s-PP having an MFR of less than 0.05 g/10 min shows too small a flowability. Accordingly, either s-PP is insufficient in processability.

The desirable MFR range is 0.1–20 g/10 min, more preferably 0.3–15 g/10 min from the aspects of high temperature flowability and processability, with most preference given to the range of 0.5–10 g/10 min from the aspects of extrusion processability and forming processability.

The method for producing the above-mentioned s-PP is subject to no particular limitation. Any organic metal complex catalyst having a symmetrical or asymmetrical molecular structure, such as a stereospecific polymer catalyst (e.g. metallocene compound), can be used as a polymerization catalyst. The polymerization conditions are not particularly limited and block polymerization, gas phase polymerization or liquid polymerization using an inert solvent can be employed.

When forming a foam from the composition of the present invention, a foaming agent such as azo compounds (e.g. azodicarbonamide, azobisisobutylonitrile, barium-azodicarboxylate and p-toluenesulfonyl semicarbazide), sulfohydrazides (e.g. benzenesulfonyl hydrazide, p-toluenesulfonyl hydrazide and 4,4'-oxybisbenzenesulfonyl hydrazide), nitroso compounds (e.g. dinitrosopentamethylene tetramine), inorganic foaming agents such as sodium bicarbonate and ammonium bicarbonate, and inert gas such as nitrogen, helium, carbonate gas and argon. In addition, a foam decomposition auxiliary such as carboxylate, carbonate and oxide, all of which having a Lewis acid, may be used on demand. Preferable foaming agent is azodicarbonamide. The foaming agent is added in a proportion of 0.1–2% by weight per s-PP.

When flame resistance is imparted to the formed article of the present invention, an inorganic and/or organic flame retardant is added to the above-mentioned s-PP (hereinafter the composition is also referred to as flame-resistant composition). Examples of the flame retardant include the following inorganic or organic compounds.

Inorganic Flame Retardant

Antimony flame retardant: antimony trioxide, antimony pentaoxide, sodium antimonate and composite flame retardant based on antimony.

Hydrates of metal oxide: aluminum hydroxide, magnesium hydroxide

Metal salt of boric acid: zinc borate, aluminum borate, zircon of boric acid, barium borate and other borate double salts Red phosphorus

Organic Flame Retardant

Phosphate and phosphorus compound containing halogen: tris(chloroethyl)phosphate, tris(monochloropropyl) phosphate, tris(dichloropropyl)phosphate, triallylphosphate, tris(3-hydroxypropyl)phosphineoxide, tris(tribromophenyl) phosphate, tetrakis(2-chloroethyl)ethylene•diphosphate, glycydil-α-methyl-β-di(butoxy)phosphinyl propionate, dibutylhydroxymethyl phosphonate, di(butoxy)phosfinyl propylamide, dimethylmethyl phosphonate, tris(2-chloroethyl)orthophosphate, ethylene-bis-tris(2-cyanoethyl) phosphonium bromide, di(polyoxyethylene)hydroxymethyl phosphonate, acid β-chloroethyl phosphate, β-chloropropylphosphate, butylpyrrophosphate, acid butyl phosphate, acid butoxyethyl phosphate, acid 2-ethylhexyl phosphate and melamine phosphate Chlorine flame retardant: chlorinated paraffin, chlorinated polyolefin, chlorinated polyethylene, perchlorotetracyclodecane, perchlorocyclopentadecane and mixture of chlorinated paraffin and antimony trioxide Bromine flame retardant: hexabromobenzene, decabromodiphenyl oxide, polydibromophenylene oxide, bis (tribromophenoxy)ethane, ethylene-bis (tetrabromophthalimide), ethylene-bis(dibromonorbornane) dicarboxyimide, dibromoethyl dibromocyclohexane, dibromoneopentyl glycol, tribromophenol, tribromophenol allyl ether, tetrabromo bisphenol A derivatives, tetrabromo bisphenol S, tetradecabromo diphenoxybenzene, tris-(2,3-dibromopropyl-1)-isocyanurate, 2,2-bis(4-hydroxy-3,5-dibromophenyl)propane, pentabromophenol, 2,2-bis(4-hydroxyethoxy-3,5-dibromophenyl)propane, pentabromotoluene, pentabromodiphenyl oxide, hexabromocyclododecane, hexabromodiphenyl ether, octabromophenol ether, octabromodiphenyl diphenyl ether, octabromodiphenyl oxide, dibromoneopentyl glycol tetracarbonate, bis(tribromophenyl)fumalamide, N-methylhexabromodiphenylamine, bromtnated epoxy resins, brominated polystyrene and bromine flame retardant Reactive flame retardant: polybromodiallyl phthalate, tetrabromophthalic anhydride, tetrabromo bisphenol A, dibromocredyl glycidyl ether, dibromophenol, diethoxy-bis-(2-hydroxyethyl)aminomethyl phosphonate, dibromocresol, tribromophenol, phenylphosphonic dichloride, diethylphenyl phosphonate, tricredylphosphate, dimethylphenyl phosphonate and diallyl chlorendate.

The flame-resistant composition of the present invention comprises an inorganic flame retardant in a proportion of 50–200 parts by weight, preferably 80–150 parts by weight per 100 parts by weight of s-PP, or an organic flame retardant in a proportion of 5–50 parts by weight, preferably 15–30 parts by weight per 100 parts by weight of s-PP, or organic flame retardant and inorganic flame retardant in combination in a proportion of about 5–200 parts by weight, preferably 55–200 parts by weight per 100 parts by weight of s-PP. When the amount of the flame retardant is below the above-mentioned range, sufficient flame retardant effect cannot be obtained, whereas when it exceeds the above-mentioned range, mechanical properties and electrical properties tend to be degraded. In the present invention, an organic flame retardant and an inorganic flame retardant are preferably used in combination to improve the flame retarding performance.

The above-mentioned flame-resistant composition can be prepared by mixing a flame retardant with s-PP by a method known per se. When an inorganic solid flame retardant is used for preparing the above-mentioned flame-resistant composition, a coupling agent may be added in a proportion of 0.05–5 parts by weight, preferably 0.5–3 parts by weight per 100 parts by weight of the solid flame retardant to avoid lowering of mechanical properties of said flame-resistant composition. Preferable examples of the coupling agent include silane coupling agent and titanate coupling agent.

For an improved weatherability of the above-mentioned flame-retardant composition, a carbon black may be added. Such carbon black is preferably added in a proportion of 0.5–40 parts by weight, preferably 1.0–10 parts by weight per 100 parts by weight of s-PP.

Examples of the carbon black include furnace black such as FEF, HAF and SRF, thermal black such as MT and channel black, with preference given to furnace black and thermal black from the aspects of flame-retardant property and mechanical properties.

In addition, the flame-resistant composition of the present invention may comprise a smoke suppressant such as a tin compound, an iron compound, a nickel compound, a molybdenum compound and a silicon compound.

When superior weatherability is required, as by a coating for protecting electric wires, for example, at least one member selected from carbon black and pigments can be added to s-PP. At least one member selected from carbon black and pigments is suitably added in a proportion of 0.01–20 parts by weight, preferably 0.05–5.0 parts by weight per 100 parts by weight of s-PP.

When the "at least one member selected from carbon black and pigments" is added in a proportion of less than 0.01 part by weight, the weatherability cannot be desirably improved, whereas addition thereof in a proportion exceeding 20 parts by weight tends to fall in achieving an improved weatherability.

Examples of said carbon black include the above-mentioned furnace black, thermal black, channel black and acetylene black which are conventionally used. In the present invention, furnace black and thermal black are preferably used to achieve the weatherability-imparting effect and processability.

Examples of the pigment include organic or inorganic pigments such as titanium oxide, zinc oxide, copper phthalocyanine blue, cyanine green, ultramarine blue pigment and iron oxide red.

When a carbon black and a pigment are used in combination, they are mixed in a desired mixing ratio, which is generally determined according to the hue desired as the color of the protecting layer. For example, when brown or gray is desired, carbon black and a pigment are mixed and adjusted to a desired hue.

When weatherability is to be improved, a commercially available ultraviolet absorber is preferably added. The ultraviolet absorber is added in a proportion of about 0.1–10 parts by weight, preferably 0.3–3 parts by weight per 100 parts by weight of s-PP.

The above-mentioned composition is obtained by mixing s-PP and at least one member selected from carbon black and pigments, by rolling method, Banbury method, kneader method or with an extruding screw.

The above-mentioned "at least one member selected from carbon black and pigments" may be used as a paste or master batch pellets.

The composition of the present invention may further comprise a soft polymer such as EP rubber, EVA (ethylene-vinyl acetate copolymer), EEA (ethylene-ethyl acrylate copolymer), EMA (ethylene-methyl acrylate copolymer) and ethylene-poly-α-olefin for imparting flexibility to the coating. The polymer is added in a weight ratio of about s-PP/soft polymer=99/1 70/30, preferably 95/5-80/20.

The composition of the present invention may further comprise additives conventionally employed for plastic, such as a hindered phenol, amine or thioether antioxidant or stabilizer, an amide or hydrazide copper inhibitor, a benzophenone or benzoin ultraviolet inhibitor, a higher fatty acid or higher fatty acid metal chloride lubricant, processing auxiliary and filler (e.g. silica and clay).

The impulse breakdown electric field strength of s-PP at room temperature is 10-25% higher than LDPE, 25-40% higher than crosslinked LDPE and 110-140% higher than i-PP; and AC breakdown electric field strength at room temperature is 2.5-8.5% higher than LDPE, 14-20% higher than crosslinked LDPE and 45-55% higher than i-PP.

The insulating composition of the present invention containing such s-PP is superior in electric properties (e.g. alternating current breakdown property, impulse breakdown property, volume resistance and dielectric constant), in particular, electric breakdown resistance, and has flexibility sufficient as an insulating material for cables. When an insulating member is manufactured from the composition containing the above-mentioned s-PP, the insulating member obtained maintains superior electric properties after gradual cooling (−10° C./min) or rapid cooling at 0° C. in ice water.

The s-PP used in the present invention is superior in terms of processability, and has a higher strength at break than HDPE which is among the conventional materials for insulating moldings. When the composition of the present invention is rapidly coold after melting, in particular, the molding obtained is superior to that obtained using HDPE, in strength at break and retention of elongation.

That is, the insulating composition of the present invention can be rapidly cooled without impairing the superior properties it has after forming by extrusion molding, injection molding or other method, and can contribute to the enhanced production efficiency by increasing the speed of processing.

The insulating formed article in the present invention includes, for example, insulating paper in admixture with cellulose, oil-soaked insulator which is a combination of said paper and an insulating oil, tape, sheet, spacer, plug, socket, pipe, insulating rod, various electric equipment moldings, circuit parts and sealant. These moldings are respectively formed by a method known per se.

The composition of the present invention is specifically preferably used for producing the following formed articles.

The composition is preferably used for producing an insulator or an insulating layer of power cables. The s-PP used in the present invention is a high melting temperature polymer superior in flexibility and electric breakdown strength. It has sufficient flexibility in comparison with the conventional i-PP, has electric breakdown properties (alternating current breakdown property, impulse breakdown property) at about room temperature, which is equal or superior to crosslinked LDPE, and has higher electrical breakdown strength at high temperature (90° C.) than crosslinked LDPE.

The s-PP used in the present invention has not only greater breakdown electric field strength at room temperature, but also impulse breakdown electric field strength at 90° C. which is 40–55% higher than conventional LDPE, 50–75% higher than crosslinked LDPE and 65–170% higher than i-PP; and AC breakdown electric field strength at 90° C. which is 15–25% higher than LDPE, 25–40% higher than crosslinked LDPE and 35–115% higher than i-PP.

The insulating composition of the present invention is used as a material for constituting the insulating layer of power cables of 6.6 kV or above, specifically for 66 kV or above. The power cables having an insulating layer formed from said composition can be prepared by a method known per se, such as continuous coating on a conductor by extrusion coating. The structure of said cable includes, for example, a cable comprising a single insulating layer formed on a conductor, a cable equipped with a jacket, a cable containing a separator on a conductor and a cable containing a semiconductor layer on a conductor or an insulator.

When an insulating layer of a low voltage power cable, from among power cables, is formed from the composition of the present invention, the composition of the present invention comprising s-PP shows superior electric properties to an insulating composition comprising conventional i-PP/EP rubber. A low voltage wire comprising an insulating layer formed from the composition of the present invention has sufficient flexibility, superior resistance to underwater breakdown and superior cut-through property.

The composition of the present invention comprising the aforementioned s-PP has superior electric properties (e.g. impulse breakdown property, alternating current breakdown property, underwater alternating current breakdown property, volume resistance and dielectric constant), as well as flexibility sufficient as an insulating layer for low voltage power cables. In addition, the composition is superior in resistance to underwater breakdown and cut-through property.

The low voltage power cables in the present invention means cables used for supplying electric power of less than 3.3 kV, and instrumentation or controlling wires. Specific examples include wires for various equipments, various circuits, underwater motors or wire harness.

The thickness (insulation thickness) of the insulating layer of the instant low voltage wire is preferably 0.1–5.0 mm, more preferably 0.2–4.0 mm, in terms of electric isolation property.

The conductor used for said low voltage wire includes, for example, known conductors such as pure copper conductor and copper alloy conductor. Besides these, the afoermentioned conductor which is plated with, for example, nickel, silver or tin may be used, with preference given to a nickel-plated conductor. Moreover, the aforementioned conductor may be baked with enamel and put to use.

The low voltage wires can be manufactured by continuously extruding an insulating layer of the aforementioned composition on a conductor (e.g. copper single wire, copper stranded wire, tin-plated copper stranded wire and enamel-baked copper single wire) by an extruder.

A wire having an insulating layer formed from the composition of the present invention has greater impulse breakdown electric field strength at room temperature, which is about 80–130% higher, AC breakdown electric field strength at room temperature which is about 30–65% higher, cut-through property which is about 20–50% higher, and resistance to underwater breakdown (underwater electrical life) which is about 30–80% higher than the conventional wires comprising an insulating material comprising i-PP/EP rubber.

A low voltage wire having an insulating layer formed from the composition of the present invention comprising the s-PP shows superior electric properties both after gradual cooling (−10° C./min) and rapid cooling thereof at 0° C. in ice water, after melt-forming of said insulating material. That is, a low voltage wire having a thin insulating layer formed from the composition of the present invention can be rapidly cooled without impairing the superior properties it has, and can contribute to the enhanced production efficiency by increasing the speed of processing (wire manufacturing speed).

When the composition of the present invention is used for forming an insulating layer of high voltage power cables comprising an insulating layer, a non-crosslinked external semiconductor layer and/or a non-crosslinked internal semiconductor layer, the cables are free from softening or deformation of insulating layer, or degradation of various electric properties due to the elevated temperature of the cables during high voltage power supply, even without crosslinking, since the composition has a sufficiently high softening temperature. That is, the use of the composition of the present invention for forming an insulating layer of high voltage power cables can result in omission of a crosslinking process, whereby the production efficiency of the cables is remarkably increased and power cables have superior electric properties.

A base polymer for the semiconductor electric material forming the non-crosslinked external semiconductor layer and non-crosslinked internal semiconductor layer, which are the elements of the above-mentioned high voltage power cable, is subject to no particular limitation as long as it is a non-crosslinked polymer. For example, HDPE, linear LDPE, polypropylene, polyurethane, polyvinyl chloride, chlorinated polyethylene and thermoplastic elastomer can be used, with preference given to thermoplastic elastomer. The thermoplastic elastomer is particularly preferably a block copolymer containing a hard phase such as frozen phase and crystalline phase, and a partially crosslinked elastomer wherein part of the elastomer is crosslinked may be also used. The hard phase of the block copolymer is exemplified by polystyrene, polyethylene, polypropylene, s-polybutadiene and transpolyisoprene. Preferable examples of the thermoplastic elestomer include styrene-butadiene copolymer (e.g. Rubberon MJ-4300C and Rubberon T-3909C manufactured by Mitsubishi Chemical Corporation), styrene-isoprene copolymer (e.g. Septon KL-2043 manufactured by Kuraray Co., Ltd.) and i-polypropylene-EPR (ethylene-propylene rubber) copolymer (e.g. Thermolan 2920N manufactured by Mitsubishi Chemical Corporation). Examples of the partially crosslinked elastomer include TPR (manufactured by Sumitomo Chemical Company, Limited) and TPE (manufactured by Uniroyal Corp.), with preference given to TPR.

The conductive substance to be added to the aforementioned base polymer is subject to no particular limitation as long as it is conventionally used for semiconductor layers. For example, a conductive carbon black such as furnace black, ketzen black (e.g. Printex XE-2 manufactured by Degussa and ketzen black manufactured by Lion Akzo) is added in a proportion of 5–40 phr (parts by weight relative to 100 parts by weight of polymer), preferably 10–25 phr.

The volume resistance according to ASTM D 991 of the above-mentioned semiconductor material is preferably $5 \times 10^{-1}$–$5 \times 10^{4}$ $\Omega$·cm in terms of relaxation of the electric field, and more preferably $5 \times 10^{0}$–$5 \times 10^{2}$ $\Omega$·cm in terms of adhesion to an insulating layer.

The elongation at room temperature according to JIS K 7113 is preferably 300–900%, more preferably 400–600% in terms of flexibility.

The strength at break according to JIS K 7113 is preferably 50–350 kg/cm$^2$, more preferably 70–250 kg/cm$^2$ in terns of the toughness of the insulator.

In the event both the internal and external semiconductor layers require crosslinking, the property of the insulating layer of the present invention cannot be exhibited. Therefore, both the internal and external semiconductor layers are formed from non-crosslinked materials and combined with the insulating layer of the present invention.

The composition for forming a semiconductor layer may comprise, like the composition of the present invention comprising s-PP, additives conventionally employed for plastic, such as a hindered phenol, amine or thioether antioxidant or stabilizer, an amide or hydrazide copper inhibitor, a benzophenone or benzoin ultraviolet inhibitor, a higher fatty acid or higher fatty acid metal chloride lubricant, processing auxiliary, organic or inorganic pigment, organic or inorganic flame retardant and filler (e.g. silica and clay).

There is no limitation imposed on the method for producing a high voltage power cable having an insulating layer of the present invention, and the cable can be manufactured by a method known per se. For example, an insulating composition and a comopsition for forming a semiconductor layer are simultaneously extruded on a conductor without crosslinking to produce a power cable.

The above-mentioned cable can be produced at high speed, since crosslinking process is not necessary. To be specific, the cable production speed can be accerelated by 30–1000% in comparison with conventional ones.

The s-PP insulating layer of the above-mentioned cable has a greater impulse breakdown electric field strength at room temperature which is 25–40% higher, AC breakdown electric field strength at room temperature which is 14–20% higher, impulse breakdown electric field strength at 90° C. which is 50–75% higher, and AC breakdown electric field strength at 90° C. which is 25–40% higher than the conventional XLPE insulating layer.

In addition, the s-PP insulating layer has a greater impulse breakdown electric field strength at room temperature which is about 20–50% higher, AC breakdown electric field strength at room temperature which is 15–40% higher, impulse breakdown electric field strength at 90° C. which is 35–80% higher, and AC breakdown electric field strength at 90° C. which is 25–30% higher than the conventional crosslinked polyethylene insulating layer.

The composition of the present invention comprising s-PP and a foaming agent affords a uniform foam having a high expansion ratio and provides a foamed article having superior electric breakdown strength and flexibility required of an insulating material for cables. Accordingly, said foamed article can be suitably used as an insulating material for cables.

In the present invention, a communication cable refers to monoaxial or coaxial (multiaxial) cables comprising at least a conductor for carrying communication current and an insulator to be directly or indirectly coated on said conductor. That is, the concept of cable broadly embraces cables, stranded wires, cords and electric wires, irrespective of the size, and encompasses not only monoaxial or coaxial cables wherein one or more single conductors prepared by stranding wires are insulated from each other, and the whole conductor is protected by a common or individual insulator, but also insulated wires wherein the outside of one conductor wire is coated with an insulator.

In communication cables, a foamed s-PP is an insulating layer to directly or indirectly cover the conductor. That is, an s-PP inslating foam in the present invention means all insulators in monoaxial or coaxial (multiaxial) cables, which is exemplified by an insulator individually covering a conductor (including sheath which is a secondary insulator covering via separator etc.) and a common insulator (sheath) covering the entirety of the assembled plural coated conductors.

Such communication cables are manufactured by a conventional method wherein an insulating material is continuously coated on a conductor by, for example, extrusion coating.

A composition comprising s-PP and a flame retardant is suitably used as a material for constituting the flame-resistant layer of a flame-resistant cable.

As stated in the above, the flame-resistant composition of the present invention comprises s-PP as a base polymer, so that it is superior in mechanical properties and electric properties in comparison with the composition comprising conventional HDPE as a base polymer. To be specific, the composition is superior in strength at break, elongation and electric breakdown strength, thus enabling use thereof as a flame-resistant layer, particularly an insulating layer or outermost layer of flame-resistant cables.

The flame-resistant cable comprising a flame-resistant layer formed from the above-mentioned flame-resistant composition of the present invention is exemplified by power cable and communication cable. The flame-resistant cable can be manufactured by a conventional cable production method.

The flame-resistant insulating layer is generally formed in the thickness of about 0.2–20 mm, preferably 0.5–15 mm.

When the flame-resistant layer is the outermost layer, it is generally formed in the thickness of about 0.5–10 mm, preferably 1–5 mm.

The flame-resistant cable comprising a flame-resistant layer of the present invention has superior flame resistance, as well as the electric properties and mechanical properties necessary for protecting cables.

The s-PP used in the present invention is superior in flowability over a wide range of temperatures, so that it is superior in mold processability by extrusion molding, injection molding and other method. Moreover, the s-PP has a high melting temperature and is superior in flexibility and toughness, enabling use of the composition comprising such s-PP for forming a coating of an optical fiber. The composition of the present invention obviates curing when forming a coating layer and is free from occurrence of pin-holes. In addition, the composition has superior flexibility and toughness, which is realized in tensile strength at break and shearing strength. As a result, an optical fiber wherein the coating has no pin-holes, has less transmission loss at, in particular, low temperature, and has superior physical properties against elongation and bending, can be provided.

The coating of the present invention is not particularly limited as long as it is formed on an optical fiber, and is exemplified by primary layer and jacket.

When the above-mentioned coating is a primary layer, the layer is generally formed in the thickness of about 0.03–0.6 mm, preferably 0.05–0.4 mm.

The jacket to be formed on the primary layer is subject to no particular limitation, and can be formed from a composition comprising the above-mentioned s-PP or a known polyamide polymer. Preferred is a jacked formed from the above-mentioned composition comprising s-PP.

On the other hand, when the above-mentioned coating is a jacket, it is generally formed in the thickness of about 0.03–0.5 mm, preferably 0.06–0.3 mm.

The primary layer to be formed under the jacket is subject to no particular limitation, and is exemplified by that formed from the above-mentioned composition comprising s-PP, a known ultraviolet (UV) curing epoxyacrylate resin or thermosetting silicone resin, with preference given to a primary layer formed from the above-mentioned composition comprising s-PP.

In the above-mentioned optical fiber, a single layer coating of a composition comprising s-PP, which integrally comprises the above-mentioned primary layer and jacket can be applied. In this case, the coating is generally formed in the thickness of about 0.06–1.0 mm, preferably 0.08–0.8 mm.

The above-mentioned coating can be formed by a conventional method, such as a method comprising extrusion coating s-PP on an optical fiber and a method comprising coating a solution of s-PP dissolved in a solvent, followed by drying.

The composition of the present invention comprising the aforementioned s-PP and carbon black and/or pigment is useful as a coating material for protecting electric wires, which can take the place of PVC and HDPE.

The above-mentioned composition is suitably used for forming a coating for protecting electric wires, since s-PP is superior in extrusion moldability, has high ESC resistance and superior mechanical properties, and s-PP is free from significant influence on the properties thereof even when prepared into a composition comprising at least one member selected from carbon black and pigment.

The s-PP used in the present invention has suitable flowability at high temperatures and is superior in processability. Accordingly, the use of an auxiliary such as a plasticizer used for PVC can be obviated, thus eliminating a problem due to bleeding out of the plasticizer.

The s-PP used in the present invention has superior ESC resistance and has higher mechanical properties such as strength at break, than HDPE which is one of the conventional wire protecting coating materials. In particular, a protecting layer comprising s-PP is superior in strength at break and retention of elongation, in comparison with a protecting layer comprising HDPE, when rapid cooling is applied after melt-molding.

The composition of the present invention comprises s-PP having superior processability, high ESC resistance and superior electric breakdown strength and mechanical properties, and at least one member selected from carbon black superior in weatherability and pigment, so that a sheath and a jacket obtained by continuous extrusion molding of the composition are imparted with electric properties, mechanical properties and physical properties necessary for protecting electric wires. In a summary fashion, the composition is suitable as a material for forming a coating to be the outermost protecting layer of wires.

In addition, the composition of the present invention can be rapidly cooled while retaining the above-mentioned superior property of s-PP, thus enabling acceleration of the processing to ultimately enhance the production efficiency of the desired formed articles.

The composition of the present invention can be used for the insulating portion of wire-connecting structures.

The method for producing wire-connecting structure, to which the composition of the present invention is applied, is subject to no particular limitation, and can be any method known per se. For example, a method wherein an insulating material is continuously extruded, by an extruder, in a molten state in a die cavity having a predetermined shape, to form an insulating portion of a connecting structure (EMJ), a method wherein an insulating composition is preliminarily formed into a predetermined shape; the insulating premold obtained by cooling is fit in a connected portion; and the insulating premold is heat-melted under pressurization to complete the insulating portion of a connecting structure (BMJ), a method wherein an insulator is processed into a tape shape; the tape is wound along the shape previously determined; a die is placed from the outside; and the tape is heat-melted under pressurization to complete the insulating portion of a connecting structure (TMJ), or a method wherein all portions constituting the connecting structure are previously formed and they are assembled by continuous operation (PJ), can be used.

EMJ and BMJ wherein s-PP is used as a starting material do not require crosslinking and the term of work can be greatly shortened. In addition, a TMJ insulating material comprising s-PP as a starting material has a higher melting temperature than materials comprising conventional LDPE base resin, so that cold flow during molding can be eliminated. A PJ insulating member comprising an insulating box formed from s-PP weighs 40–70% less than conventional epoxy PJ.

The insulating portion of the wire-connecting structure of the present invention has a greater impulse breakdown electric field strength at room temperature which is about 20–50% higher, AC breakdown electric field strength at room temperature which is 15–20% higher, impulse breakdown electric field strength at 90° C. which is 35–80% higher, and AC breakdown electric field strength at 90° C. which is 25–30% higher than the insulating portion made from the conventional crosslinked low density polyethylene insulating layer.

The present invention is described in more detail by way of the following Examples, to which the present invention is not limited.

EXAMPLE 1

Various syndiotactic polypropylenes shown in Table 1 having a syndiotactic pentad ratio of 0.80–0.95 were continuously extrusion-molded by an extruder equipped with a 50 mmφ T die at 180° C., respectively, to give 1 mm thick tapes.

After melt-forming at 180° C. using a compression molding machine for 5 minutes, the obtained tapes were gradually cooled (by leaving at room temperature) or rapidly cooled in 0° C. ice water to give sheets having an ultimate thickness of 0.3 mm, which were then subjected to the tests for the evaluation of the tapes.

Various polymer properties were determined with respect to respective insulating materials as in the following.

Syndiotactic pentad ratio was expressed in the ratio, based on tetramethylsilane, of the peak intensity measured at 20.2 ppm (peak intensity of methyl which is ascribed to syndiotactic pentad continuous chain) to a peak intensity ascribed to the total methyl group in propylene units, in the $^{13}$C-NMR spectrum determined at 67.8 MHz in a 1,2,4-trichlorobenzene solution at 135° C. MFR was determined according to ASTM-D-1238 at load 10 kgf and temparature 230° C., and melting temperature was determined by measuring the peak top temperature by the DSC method. Molecular weight was determined by gel permeation chromatography. The above-mentioned respective properties were also determined in the same way in Examples and Comparative Examples to follow.

The respective specimens were subjected to impulse breakdown test, AC (alternating current) breakdown test and physical property test, using a 25 mmφ sphere-sphere electrode in an improved McKeown electrode system as shown in FIG. 1. In the impulse breakdown test, 1×40 μsec negative impulse standard wave was applied by the conditions of step-up voltage of 1 kV/3 times application. The initial voltage was taken as 70% presumed breakdown voltage. In the impulse breakdown test and AC breakdown test, 10 specimens were subjected to the test per one condition, which data was then subjected to Weibull analysis. The breakdown value at breakdown probability of 63.3% was taken as the breakdown voltage of the specimen (the same in the following Examples and Comparative Examples).

The physical property test was performed according to JIS K 7113 using a tensilon tensil tester.

The electric breakdown properties at room temperature are shown in Table 1 and the physical properties are shown in Table 2.

COMPARATIVE EXAMPLE 1

Using s-PP having a syndiotactic pentad ratio of 0.6, conventional i-PP and LDPE (made by high pressure method), specimens were prepared in the same manner as in Example 1, and electric properties and mechanical properties were evaluated.

The results are shown in Table 1 and Table 2.

TABLE 1

|  | rrrr | MFR (g/10 min) | melting temperature (°C.) | impulse breakdown voltage (kV/mm) | | AC breakdown voltage (kV/m) | |
|---|---|---|---|---|---|---|---|
|  |  |  |  | gradual cooling | 0° C. rapid cooling | gradual cooling | 0° C. rapid cooling |
| Example 1 | 0.80 | 8.90 | 130 | 310 | 320 | 84.4 | 90.5 |
| s-PP | 0.84 | 0.50 | 136 | 300 | 330 | 82.1 | 80.0 |
|  | 0.86 | 0.63 | 144 | 305 | 348 | 81.0 | 81.5 |
|  | 0.89 | 0.34 | 148 | 325 | 335 | 80.8 | 82.8 |
|  | 0.91 | 1.20 | 149 | 295 | 320 | 81.2 | 82.3 |

TABLE 1-continued

|  | mrr | MFR (g/10 min) | melting temperature (°C.) | impulse breakdown voltage (kV/mm) | | AC breakdown voltage (kV/m) | |
|---|---|---|---|---|---|---|---|
|  |  |  |  | gradual cooling | 0° C. rapid cooling | gradual cooling | 0° C. rapid cooling |
|  | 0.93 | 1.30 | 151 | 330 | 315 | 83.8 | 85.1 |
|  | 0.94 | 1.20 | 150 | 325 | 345 | 82.0 | 83.0 |
|  | 0.95 | 14.00 | 153 | 275 | 320 | 83.5 | 82.8 |
| Comp. Ex. 1 |  |  |  |  |  |  |  |
| s-PP | 0.60 | 1.20 | — | 220 | 235 | 56.0 | 53.5 |
| i-PP | — | 1.60 | 160 | 125 | 190 | 54.6 | 72.3 |
| LDPE | — | 1.10 | 110 | 250 | 260 | 77.5 | 78.0 | mrr: syndiotactic pentad ratio
MFR: according to JIS K 6760
melting temperature: Peak top temperature by DSC method

TABLE 2

|  | mrr | MFR (g/10 min) | Mw/Mn | YS (kg/cm$^2$) | | TS (kg/cm$^2$) | | Elo. (%) | |
|---|---|---|---|---|---|---|---|---|---|
|  |  |  |  | 0° C. rapid cooling | gradual cooling | 0° C. rapid cooling | gradual cooling | 0° C. rapid cooling | gradual cooling |
| Example 1 | 0.80 | 8.90 | 2.4 | 120 | 134 | 312 | 290 | 595 | 570 |
| s-PP | 0.84 | 0.50 | 2.5 | 185 | 201 | 336 | 388 | 510 | 565 |
|  | 0.86 | 0.63 | 6.1 | 196 | 225 | 345 | 277 | 550 | 530 |
|  | 0.89 | 0.34 | 5.5 | 202 | 235 | 322 | 395 | 525 | 560 |
|  | 0.91 | 1.20 | 2.2 | 183 | 247 | 406 | 414 | 510 | 555 |
|  | 0.93 | 2.30 | 2.3 | 158 | 250 | 466 | 422 | 525 | 520 |
|  | 0.94 | 1.20 | 2.2 | 162 | 275 | 448 | 435 | 510 | 525 |
|  | 0.80 | 14.00 | 2.2 | 155 | 300 | 382 | 335 | 545 | 425 |
| Comp. Ex. 1 s-PP | 0.60 | 1.20 | 2.4 | 8 | 7 | — | — | no break | no break |
| LDPE | — | 0.10 | — | 100 | 105 | 193 | 200 | 655 | 780 |

(*LDPE manufactured by high pressure method, MFR = 0.1 g/10 min, destiny 0.920 g/cm$^3$, softening temperature 91° C., melting temperature 109° C.)
YS: tensile yield strength (stress at yielding point)
TS: tensile strength at break (stress at maximum elongation)
Elo.: tensile elongation (tensile elongation at break)
Mw: weight average molecular weight
Mn: number average molecular weight As is evident from Table 1 and Table 2, the insulating tape manufactured from the insulating composition of the present invention maintained fine electric properties and mechanical properties after gradual cooling and rapid cooling at 0° C. after processing into sheets.

The insulating composition of the present invention using a specific s-PP has superior electric properties and mechanical properties. In particular, when the article formed from said insulating material was reprocessed, it maintained superior electric properties and mechanical properties even by rapid cooling or gradual cooling after the processing. That is, the insulating composition of the present invention is superior in electric properties and is capable of providing an article having high strength. In addition, even when reprocessed under a wide range of processing conditions, it can maintain superior electric properties and mechanical properties.

EXAMPLE 2, COMPARATIVE EXAMPLE 2

Various syndiotactic polypropylenes shown in Table 3 having a syndiotactic pentad ratio of 0.80–0.95 were melted at 180° C. in a compression molding machine for 15 minutes, formed, and gradually cooled (by leaving at room temperature) to give 0.3 mm-thick sheets.

The respective sheets were subjected to impulse breakdown test and AC breakdown test, using an improved McKeown electrode system. In the impulse breakdown test, 1×40 μsec negative impulse standard wave was applied under the conditions of step-up voltage of 5 kV/3 times application, based on a 70% presumed breakdown voltage as the initial value.

AC breakdown test: a voltage was applied by step-up voltage of 1 kv/minute, based on a 70% presumed breakdown voltage as the initial value.

For comparison, s-PP having a syndiotactic pentad ratio of 0.60, i-PP, LDPE and XLPE were subjected to the same determination as above.

The electric breakdown properties at room temperature are shown in Table 3 and the electric breakdown properties at 90° C. are shown in Table 4.

TABLE 3

| | mmr | MFR (g/10 min) | melting temperature (°C.) | impulse breakdown voltage (kV/mm) gradual cooling | AC breakdown voltage (kV/mm) gradual cooling |
|---|---|---|---|---|---|
| Example 2 | 0.80 | 8.90 | 130 | 320 | 85.0 |
| s-PP | 0.84 | 0.50 | 136 | 315 | 86.3 |
| | 0.86 | 0.63 | 144 | 305 | 87.8 |
| | 0.89 | 0.34 | 148 | 345 | 82.8 |
| | 0.91 | 1.20 | 149 | 300 | 82.5 |
| | 0.93 | 2.30 | 151 | 340 | 86.2 |
| | 0.94 | 1.20 | 150 | 337 | 82.5 |
| | 0.95 | 14.00 | 153 | 298 | 86.5 |
| Comparative Example 2 | | | | | |
| s-PP | 0.60 | 1.20 | — | 245 | 58.0 |
| i-PP | — | 1.60 | 160 | 140 | 56.6 |
| LDPE | — | 1.10 | 110 | 270 | 80.5 |
| XLPE | — | — | 105 | 240 | 72.0 | mmr: syndiotactic pentad ratio
MFR: JIS K 6760-1971
melting temperature: peak top temperature by DSC method

TABLE 4

| | mmr | MFR (g/10 min) | melting temperature (°C.) | impulse breakdown voltage (kV/mm) gradual cooling | AC breakdown voltage (kV/mm) gradual cooling |
|---|---|---|---|---|---|
| Example 2 | 0.80 | 8.90 | 130 | 255 | 76.5 |
| s-PP | 0.84 | 0.50 | 136 | 250 | 77.6 |
| | 0.86 | 0.63 | 144 | 260 | 78.4 |
| | 0.89 | 0.34 | 148 | 286 | 75.2 |
| | 0.91 | 1.20 | 149 | 264 | 74.6 |
| | 0.93 | 2.30 | 151 | 285 | 77.5 |
| | 0.94 | 1.20 | 150 | 278 | 76.9 |
| | 0.95 | 14.00 | 153 | 259 | 78.4 |
| Comparative Example 2 | | | | | |
| s-PP | 0.60 | 1.20 | — | 205 | 45.0 |
| i-PP | — | 1.60 | 160 | 105 | 35.7 |
| LDPE | — | 1.10 | 110 | 178 | 63.0 |
| XLPE | — | — | 105 | 167 | 59.0 |

EXAMPLE 3 s-PPs having a syndiotactic pentad ratio of 0.86 and 0.93 were continuously extrusion-coated (coating thickness: 1 mm) on copper stranded conductors (2 mm diameter) by a 30 mm$\phi$ extruder (extrusion temperature $C_1$: 180° C., $C_2$: 185° C., $C_3$: 181° C., D: 180° C.) to give cables. The cables obtained had fine appearance, and the flexibility of the cables was almost the same as that of XLPE cables.

The insulating composition of the present invention has superior electric properties, particularly superior electric breakdown strength at high temperature, which contributes to increasing credability of the cables manufactured using said composition. In addition, the composition can decrease the insulation thickness necessary for meeting the predetermined properties, which in turn miniaturizes the volume. Accordingly, the composition is suitable for forming an insulator of high voltage power cable of not less than 6.6 kV, in particular, not less than 66 kV.

EXAMPLES 4–11, COMPARATIVE EXAMPLE 3

Insulating materials A–I comprising various s-PP (homopolymer) having a syndiotactic pentad ratio and MFR as shown in Table 5 were heated at 180° C. in a compression molding machine for 15 minutes, formed, and gradually cooled (by leaving at room temperature) or rapidly cooled in 0° C. ice water to give 0.3 mm-thick sheets. In Comparative Example 3, s-PP having a syndiotactic pentad ratio of 0.6 was treated in the same manner as in Example 1 to give a sheet.

COMPARATIVE EXAMPLE 4

In the same manner as in Example 4 except that an insulating material J comprising i-PP/EP rubber (weight ratio 70/30) was used instead of s-PP, a 0.3 mm-thick sheet was obtained.

With respect to the respective specimens obtained in the above-mentioned Examples and Comparative Examples, an electric breakdown test and AC breakdown test were done in the same manner as in Example 2. The results are shown in Table 5.

TABLE 5

| | insulating material | polymer | mmr | MFR (g/10 min) | melting temperature (°C.) | Mw/Mn | impulse breakdown voltage (kV/mm) gradual cooling | impulse breakdown voltage (kV/mm) 0° C. rapid cooling | AC breakdown voltage (kV/m) gradual cooling | AC breakdown voltage (kV/m) 0° C. rapid cooling |
|---|---|---|---|---|---|---|---|---|---|---|
| Example 4 | A | s-PP | 0.80 | 8.90 | 130 | 2.4 | 320 | 320 | 85.0 | 93.8 |
| Example 5 | B | s-PP | 0.84 | 0.50 | 136 | 2.5 | 315 | 338 | 86.3 | 82.5 |
| Example 6 | C | s-PP | 0.86 | 0.63 | 144 | 6.1 | 305 | 348 | 87.8 | 86.5 |
| Example 7 | D | s-PP | 0.89 | 0.34 | 148 | 5.5 | 345 | 335 | 82.8 | 82.5 |
| Example 8 | E | s-PP | 0.91 | 1.20 | 149 | 2.2 | 300 | 340 | 82.5 | 82.3 |
| Example 9 | F | s-PP | 0.93 | 2.30 | 151 | 2.3 | 340 | 329 | 86.2 | 88.1 |
| Example 10 | G | s-PP | 0.94 | 1.20 | 150 | 2.2 | 337 | 351 | 82.5 | 85.5 |
| Example 11 | H | s-PP | 0.95 | 14.00 | 153 | 2.2 | 298 | 338 | 86.5 | 84.1 |
| Comparative Example 3 | I | s-PP | 0.60 | 1.20 | — | 2.4 | 220 | 235 | 58.0 | 53.5 |
| Comparative Example 4 | J | *1 | — | 0.40 | 164 | — | 125 | 210 | 35.6 | 38.5 | mmr: syndiotactic pentad ratio
*1: i-PP, EP rubber (weight ratio 70/30)

As is evident from Table 5, the insulating composition for low voltage wires of the present invention showed fine electric breakdown property after gradual cooling or rapid cooling at 0° C.

EXAMPLES 12–19, COMPARATIVE EXAMPLES 5 AND 6

The insulating materials A to J were continuously extrusion-coated in a thickness of 0.6 mm by a 30 mmφ extruder (extrusion temperature $C_1$: 180° C., $C_2$: 185° C., $C_3$: 181° C., D: 180° C.) as insulating layers on copper stranded wires having a conductor diameter of 2.2 mm, which were then baked with polyester enamel (0.05 mm thickness) to give low voltage wires for underwater winding motor.

The low voltage wires obtained in the above Examples had fine appearance and sufficient flexibility, like the conventional low voltage wire of Comparative Example 6.

The low voltage wires obtained in the above-mentioned Examples and Comparative Example were examined for underwater breakdown resistance and cut-through property as in the following.

The underwater breakdown strength was determinted using the low voltage wires in water (AC 6V, water temperature 60° C.) and measuring the time until insulation breakdown (underwater electrical life).

The cut-through property was determined according to the test method defined in UL AWM 3239, under the conditions of 80° C., load 450 g×2 and energizing direct current voltage of 1 kV, by measuring the time until insulation breakdown.

The results are shown in Table 6.

TABLE 6

| | insulating material | underwater breakdown property (time/hrs) | cut-through property |
|---|---|---|---|
| Example 12 | A | 290 | 7.4 |
| Example 13 | B | 295 | 8.6 |
| Example 14 | C | 351 | 8.2 |
| Example 15 | D | 370 | 7.9 |
| Example 16 | E | 315 | 8.4 |
| Example 17 | F | 340 | 8.1 |
| Example 18 | G | 338 | 8.9 |
| Example 19 | H | 360 | 8.6 |
| Comparative Example 5 | I | 165 | 3.8 |
| Comparative Example 6 | J | 205 | 6.2 |

As is evident from Table 6, the low voltage wires having an insulating layer of the present invention showed superior underwater breakdown resistance and cut-through property.

The composition of the present invention has superior electric properties and flexibility. The article formed from the composition of the present invention shows superior electric properties even after rapid cooling following processing, so that the processing speed is increased, thereby improving production efficiency. Moreover, the low voltage wires formed from the insulating composition of the present invention have superior electric properties and flexibility, and are superior in underwater breakdown property and cut-through property. Accordingly, the insulating composition of the present invention is suitable as an insulating material for low voltage wires to be used for various equipments, specifically underwater motors.

EXAMPLES 20–23, COMPARATIVE EXAMPLE 7

An s-PP having a syndiotactic pentad ratio of 0.91 and an MFR of 1.20 g/10 min for a 1 mm thick insulating layer, and styrene-butadiene copolymer (Rabalon MJ-4300 or Rabalon T-3909C, manufactured by Mitsubishi Chemical Corporation), styrene-isoprene copolymer (Septon KL-2043, manufactured by Kuraray Co., Ltd.), or i-PP-EPR copolymer (Thermolan 2920N, manufactured by Mitsubishi Chemical Corporation) added with 20 phr of furnace black (Printex XE-2, manufactured by Degussa) for 0.5 mm semiconductor layers inside and outside the insulator, were simultaneously extrusion-molded at 180° C. on 2.7 mm copper conductors to give pseudo-high voltage power cables having inside and outside semiconductor layers. The cables were subjected to either cooling by leaving at room temperature (gradual cooling) or cooling in a 0° C. ice water bath, immediately after extrusion (rapid cooling).

These specimens were subjected to an impulse breakdown resistance test and an AC breakdown test at room temperature.

EXAMPLES 24–27

In the same manner as in Examples 20 to 23 except that an s-PP having a syndiotactic pentad ratio of 0.95 and an MFR of 14.0 g/10 min was used, four kinds of semiconductor layers were manufactured to give pseudo-cables.

Note that XLPE used in Comparative Example 7 required crosslinking, and the production speed thereof was 0.8–1.0 m/min when that of Examples 20 to 27 was 30–35 m/min.

The impulse breakdown test was performed in the same manner as in Example 2.

The AC breakdown test was performed by applying a voltage by step-up application of 2 kV/1 min, based on a 70% value of the presumed breakdown voltage as the initial value.

The results are shown in Table 7.

TABLE 7

| | insulating material | mrr*[1] | MFR*[2] (g/10 min) | semiconductor material | volume resistance of semiconductor material (Ω · cm) | Impulse breakdown voltage (kV/mm) | | AC breakdown voltage (kV/mm) | |
|---|---|---|---|---|---|---|---|---|---|
| | | | | | | gradual cooling | 0° C. rapid cooling | gradual cooling | 0° C. rapid cooling |
| Example 20 | s-PP | 0.91 | 1.20 | KJ-4300C | 2.5 | 315 | 335 | 86 | 95 |
| Example 21 | s-PP | 0.91 | 1.20 | T-3909C | 3.4 | 325 | 345 | 95 | 105 |
| Example 22 | s-PP | 0.91 | 1.20 | KL-2043 | 4.5 | 335 | 315 | 104 | 116 |
| Example 23 | s-PP | 0.91 | 1.20 | 2920N | 2.3 | 295 | 310 | 89 | 96 |
| Example 24 | s-PP | 0.95 | 14.0 | MJ-4300C | 2.5 | 310 | 340 | 95 | 100 |

TABLE 7-continued

|  | insulating material | rrrr*[1] | MFR*[2] (g/10 min) | semi- conductor material | volume resis- tance of semiconductor material (Ω · cm) | Impulse breakdown voltage (kV/mm) | | AC breakdown voltage (kV/mm) | |
|---|---|---|---|---|---|---|---|---|---|
|  |  |  |  |  |  | gradual cooling | 0° C. rapid cooling | gradual cooling | 0° C. rapid cooling |
| Example 25 | s-PP | 0.95 | 14.0 | T-3909C | 3.4 | 310 | 335 | 105 | 115 |
| Example 26 | s-PP | 0.95 | 14.0 | KL-2043 | 4.5 | 305 | 325 | 115 | 120 |
| Example 27 | s-PP | 0.95 | 14.0 | 2920N | 2.3 | 300 | 345 | 90 | 105 |
| Comparative Example 7 | XLPE*[3] | — | — | Conventional product*[4] | 150 | 250 | 240 | 80 | 83 |

(Note)
*[1]syndiotactic pentad ratio
*[2]According to JIS K 6760
*[3]Yukaron ZF-30R (manufactured by Mitsubishi Chemical Corporation), crosslinked with DCP (2.0 phr)
*[4]Yukaron EVA301 (manufactured by Mitsubishi Chemical Corporation), added with acetylene black (50 phr) and crosslinked From Table 7, it is evident that s-PP has particularly superior electric breakdown resistance. Accordingly, the cable formed from a composition comprising such s-PP increases the credibility of the cable, can reduce the thickness of the insulating layer necessary for satisfying the predetermined properties, and can miniaturize the cables.

The high voltage power cables having inside and outside semiconductor layers of Examples 20–27 do not require crosslinking of an insulating layer, and the inside and outside semiconductor layers, since they comprise the insulating layer of the present invention. Accordingly, the cable production speed can be speeded up by 30–1000% in comparison with the conventional speed. Since the insulating layer of the cables thus obtained has superior electric properties, it increases the credibility of the cable, can reduce the thickness of the insulating layer necessary for satisfying the predetermined properties, and can miniaturize the cables.

EXAMPLES 28–33, COMPARATIVE EXAMPLE 8

Various s-PPs having a syndiotactic pentad ratio of 0.7–0.95 as shown in Table 8 and HDPE for comparison $$\text{Expansion ratio (\%)} = \frac{\text{density of resin before foaming} - \text{density of foams}}{\text{density of foams}} \times 100$$

Cell size: A cross section of the foamed articles was observed. The longer diameters of 10 cells selected at random were measured with a nonius and the average diameter was taken as the cell size.

$$\text{Dielectric constant } (\epsilon) \text{ (F/m)}: \frac{\text{electric flux density (C/m}^2\text{)}}{\text{electric field (V/m)}}$$

TABLE 8

|  | insulating material | rrrr | melting temperature (°C.) | MFR (g/10 min) | expan- sion ratio(%) | cell size (μ) | dielectric constant |
|---|---|---|---|---|---|---|---|
| Example 28 | s-PP | 0.80 | 130 | 8.90 | 46.0 | 100 ~ 200 | 1.43 |
| 29 | " | 0.89 | 148 | 0.34 | 60.5 | 50 ~ 100 | 1.40 |
| 30 | " | 0.91 | 149 | 1.20 | 49.2 | 100 ~ 200 | 1.42 |
| 31 | " | 0.93 | 151 | 2.30 | 52.1 | 100 ~ 200 | 1.41 |
| 32 | " | 0.94 | 150 | 1.20 | 47.2 | 50 ~ 100 | 1.43 |
| 33 | " | 0.84 | 136 | 0.50 | 61.0 | 50 ~ 100 | 1.40 |
| Comparative Example 8 | HDPE | — | 135 | 0.26 | 30.5 | 100 ~ 300 or above | 1.50 | rrrr: Syndiotactic pentad ratio
MFR: ASTM-D-1238
Melting temperature: DSC method (Peak top)

were added with 1.0% (% by weight of the polymer) azodicarbonamide as a foaming agent a 30 mmφ extruder. A nitrogen gas was forced into the extruder at a rate of 400 ml/min and the material was continuously extrusion-coated (extrusion temperature $C_1$: 180° C., $C_2$: 185° C., $C_3$: 181° C., D: 180° C.) in a thickness of 1 mm on copper stranded conductors (2 mm diameter) to give cables. The various cables were examined for expansion ratio, cell size and dielectric constant, the results of which are summarized in Table 8.

The communication cables of Examples 28–33 comprised the foamed product of the present invention as an insulator. The foamed product was uniform and had a high expansion ratio, which in turn reduces occurrence of noises and prevents lowering of transmission efficiency. The insulating layer has sufficient dielectric constant and mechanical properties as an insulating layer of communication cables.

EXAMPLES 34–41

An inorganic flame retardant $Mg(OH)_2$ (100 parts by weight) and FEF carbon black (5 parts by weight) were added to various syndiotactic polypropylene (100 parts by weight) having a predetermined syndiotactic pentad ratio and an MFR as shown in Table 9 to give compositions.

The respective compositions were processed by a compression molding machine at 180° C. for 15 minutes and gradually cooled to give 1.0 mm thick sheets. The sheets obtained were examined for physical properties according to JIS K 7113. In addition, flame resistance (OI: oxygen index) was determined according to JIS K 7210. The results are shown in Table 9.

In the same manner as above, 0.3 mm thick sheets were prepared and subjected to an impulse breakdown resistance test and an AC breakdown test in the same manner as in Example 2. The electric breakdown property at 25° C. is shown in Table 9.

As physical properties, tensil strength at break (TS) according to JIS K 7113 and elongation at break (Elo.) according to JIS K 7113 were determined. The maximum tensil stress and elongation at break are shown in Table 9.

COMPARATIVE EXAMPLES 9 AND 10

In the same manner as above except that an s-PP having a syndiotactic pentad ratio of 0.6 (Comparative Example 9) and HDPE (Comparative Example 10) were used in place of the s-PP used in the above Examples, compositions were prepared, from which sheets were manufactured by a compression molding machine in the same manner as in the above Examples. The syndiotactic pentad ratio (rrrr), melt flow rate (MRF), flame resistance, physical properties and electric breakdown property of each sheet are shown in Table 9.

EXAMPLE 42

In the same manner as in Example 34 except that an organic flame retardant, decabromodiphenyl ether (30 parts by weight), and an inorganic flame retardant, antimony trioxide (15 parts by weight), were used as flame retardants, a composition was prepared.

EXAMPLE 43

In the same manner as in Example 34 except that an organic flame retardant, perchlorotetracyclodecane (30 parts by weight), and tricresyl phosphate (10 parts by weight), and an inorganic flame retardant, aluminum hydrochloride (15 parts by weight), were used as flame retardants, a composition was prepared.

Using the compositions prepared in the above-mentioned Examples 42 and 43, sheets were prepared in the same manner as in Example 34. The sheets were examined for physical properties and flame resistance. In addtion, an impulse breakdown resistance test and an AC breakdown test were performed. The results are shown in Table 9.

TABLE 9

|  | specimen | rrrr | MFR (g/10 min) | OI point | TS (kg/cm$^2$) | Elo. (%) | impulse breakdown voltage (kV/mm) | AC breakdowm voltage (kV/mm) |
| --- | --- | --- | --- | --- | --- | --- | --- | --- |
| Example 34 | s-PP | 0.80 | 8.90 | 26 | 95 | 220 | 240 | 61.5 |
| 35 | " | 0.84 | 0.50 | 25 | 135 | 310 | 255 | 68.2 |
| 36 | " | 0.86 | 0.63 | 25 | 146 | 255 | 268 | 70.3 |
| 37 | " | 0.89 | 0.34 | 26 | 152 | 280 | 270 | 65.8 |
| 38 | " | 0.91 | 1.20 | 26 | 159 | 325 | 279 | 66.3 |
| 39 | " | 0.93 | 2.30 | 25 | 155 | 295 | 285 | 62.4 |
| 40 | " | 0.94 | 1.20 | 27 | 150 | 305 | 290 | 63.7 |
| 41 | " | 0.95 | 14.00 | 26 | 165 | 310 | 264 | 62.6 |
| 42 | " | 0.89 | 0.34 | 28 | 176 | 360 | 275 | 68.2 |
| 43 | " | 0.89 | 0.34 | 29 | 164 | 320 | 280 | 71.5 |
| Comp. Ex. 9 | s-PP | 0.60 | 1.20 | 22 | 5 | no break | 130 | 41.1 |
| 10 | HDPE | — | 1.10 | 22 | 65 | 125 | 160 | 49.0 |

EXAMPLE 44

Three layers of inner semiconductor layer, insulating layer and external semiconductor layer were extrusion-coated on the periphery of a conductor (copper stranded wire of 10 mm outer diameter) by the tandem extrusion method. The composition prepared in Example 34 was formed into a 4.0 mm thick insulating layer. A composition prepared by adding acetylene black (50 parts by weight) to 100 parts by weight of EVA (VA=25% by weight) was formed into a 1.0 mm thick inner semiconductor layer. Said EVA containing carbon was formed into a 0.3 mm thick external semiconductor layer. The extrusion-coated conductor was cooled and applied with extrusion-coating of a soft polyvinyl chloride sheath (1.0 mm thickness) to give a monoaxial sheath cable. The insulating layer of the obtained power cable was flame-resistant and had high strength at break. Moreover, the layer was superior in elongation and electric breakdown strength. The power cable had superior electric properties and mechanical properties.

EXAMPLE 45

The composition prepared in Example 34 was extrusion-coated on the power cable manufactured in Example 44 to form an anti-corrosion layer, whereby a power cable was obtained. The power cable obtained had superior flame resistance, electric properties and mechanical properties.

As described above, the flame-resistant composition of the present invention comprises s-PP as a base polymer and is superior in mechanical properties and electric properties in comparison with the conventional composition comprising HDPE as a base polymer. Consequently, the composition has high strength at break, and is superior in elongation and electric breakdown strength. Accordingly, the flame-resistant composition of the present invention can be suitably used as a flame-resistant layer of flame-resistant cables. In addition, this flame-resistant composition is superior in processability.

The flame-resistant cables comprising the flame-resistant layer of the present invention have superior flame resistance, as well as superior electric properties and mechanical properties necessary for protecting cables.

EXAMPLES 46–53

Various syndiotactic polypropylene having a syndiotactic pentad ratio of 0.80–0.95, as shown in Table 10, were extrusion-molded at 180° C. by an extrusion molding machine to form a 0.15 mm thick coating layer on the outer periphery of optical fibers. The respective optical fibers were checked for pin-holes in the coating layer and subjected to a transmission loss test according to JIS C 6826, the results of which are shown in Table 10.

The pin-hole checking was done by observing the surface of the coating of the optical fibers, using an optical microscope of 200 magnitude and counting pin-holes of 10 μm or above in diameter and calculating the number of the pin-holes per 1 cm of the fibers.

COMPARATIVE EXAMPLE 11

In the same manner as in the above-mentioned Examples except that an s-PP having a syndiotactic pentad ratio of 0.6 was used as the resin for forming a coating layer, an optical fiber was prepared.

COMPARATIVE EXAMPLE 12

In the same manner as in the above-mentioned Examples, a coating layer comprising a 60 μm thick UV curing resin (primary layer) composed of a non-solvent type silicone UV curing resin (X-62-7003, manufactured by Shin-Etsu Chemical Co., Ltd.) and a 80 μm thick UV curing resin (secondary coating) composed of a modified acrylate UV curing resin (Number 3001, manufactured by Threebond Corp.) was formed instead of using s-PP.

Said coating layer was formed by dip coating the resin of the primary layer on an optical fiber, heat-drying same, UV curing, dip coating the resin of the secondary layer, heat-drying same, and UV curing.

The optical fibers obtained in Comparative Examples 11 and 12 were subjected to pin-hole checking of the coating layer and a transmission loss test at −30° C. in the same manner as in the above Examples, the results of which are shown in Table 10.

ultraviolet rays or heat, which results in suppression of pin-holes developed in the coating layer. Accordingly, the use of this coating layer results in constant cramping of optical fiber and absence of distortion in the optical fiber, so that the optical fiber shows superior transmission efficiency. In addition, the absence of curing treatment can contribute to the improvement of production efficiency of the optical fiber, resulting in reduction of production costs.

The coating layer made from the specific syndiotactic polypropylene has both flexibility and toughness. Accordingly, the coating layer can impart, to an optical fiber, high resistance to elongation and bending, suppression of contraction when cooled to a low temperature and greatly decreased transmission loss at low temperatures.

Said coating layer can exhibit sufficient physical properties even in a single layer, obviating the need to form a primary layer and a jacket, as in the conventional coating layer of optical fibers, so that a primary layer and a jacket can be integrally formed.

EXAMPLES 54–61

An FEF black (trademark HTC#100, manufactured by Chubu Carbon Corp., 0.3 part by weight) was added as a carbon black to various syndiotactic polypropylene (100 parts by weight) having a predetermined syndiotactic pentad ratio and a MFR as shown in Table 11 to prepare a coating material for protecting wires.

EXAMPLE 62

In the same manner as in Example 60 except that 1.0 part by weight of 2-hydroxybenzophenone was added as an ultraviolet absorber to 100 parts by weight of s-PP, a coating composition for protecting wires was prepared.

The coating compositions for protecting wires were melformed at 180° C. for 15 minutes by a compression molding machine and cooled by leaving at room temperature (gradual cooling) or by using ice water of 0° C. (rapid cooling) to prepare 1.0 mm thick sheets. The obtained sheets were examined for ESC resistance (according to JIS K 6760) and physical properties (according to JIS K 7113), the results of which are shown in Table 11.

TABLE 10

| | specimen | rrrr | MFR (g/10 min) | TS (kg/cm$^2$) | Elo. (%) | number of pin-holes (number/cm) | transmission loss (dB/km) |
|---|---|---|---|---|---|---|---|
| Example 46 | s-PP | 0.80 | 8.90 | 95 | 220 | none | 0.6 |
| 47 | " | 0.84 | 0.50 | 135 | 310 | none | 0.4 |
| 48 | " | 0.86 | 0.63 | 146 | 255 | none | 0.7 |
| 49 | " | 0.89 | 0.34 | 152 | 280 | none | 0.6 |
| 50 | " | 0.91 | 1.20 | 159 | 325 | none | 0.5 |
| 51 | " | 0.93 | 2.30 | 155 | 295 | none | 0.7 |
| 52 | " | 0.94 | 1.20 | 150 | 305 | none | 0.4 |
| 53 | " | 0.95 | 14.00 | 165 | 310 | none | 0.3 |
| Comp. Ex. 11 | s-PP | 0.60 | 1.20 | 5 | no break | none | 0.9 |
| 12 | UV | — | — | 65 | 125 | 12.2 | 4.2 |

UV is modified acrylate UV curing resin.
TS, Elo.: Measured using a sheet (0.15 mm thickness) according to JIS K 7113.

As is evident from Table 10, the optical fibers of the Examples had no pin-holes in the coating layer, and showed superior transmission loss at a low temperature.

The optical fibers of the Examples comprise a coating layer of the present invention which is made from a specific syndiotactic polypropylene. The coating layer does not require a curing treatment in forming the layer, thus obviating the need for the conventional curing treatment using The ESC resistance was determined according to JIS K 6760. That is, 10 specimens were soaked in a 10% by weight acqueous solution of Igeparl CO-630 (test solution) at 50°±0.5° C. for 48 hours and the specimens having cracks on visual observation were counted. As physical properties, tensil yield strength (YS), tensil strength at break (TS) and tensil elongation at break (Elo.) were measured and the stress at yield, the maximum tensil stress and elongation at break were calculated.

COMPARATIVE EXAMPLES 13 AND 14

In the same manner as in the above Examples except that an s-PP having a syndiotactic pentad ratio of 0.6 (Comparative Example 13) and HDPE (Comparative Example 14) were used instead of the s-PP, coating compositions for protecting wires were prepared. Using the compositions, sheets were prepared by a compression molding machine as in the above Examples. The sheets were examined for rrrr, MFR, ESC resistance and physical properties, in the same manner as in the above Examples, the results of which are shown in Table 11.

extrusion-filled as pseudo-EMJ in a molten state at 175° C. into a die cavity designed to form a cylindrical insulating layer having an insulation thickness of 10 mm and a length of 300 mm, by a 30 mm$\phi$ extruder on a conductor having a sectional area of 250 mm$^2$, which had been applied with a 1 mm thick semi-conducting layer, and was left standing without crosslinking to give an EMJ insulating layer.

The impulse breakdown strength and AC breakdown electric field strength at room temperature (RT) and 90° C. of the obtained EMJ insulating layers were determined.

The impulse breakdown test was done in the same manner as in Example 2.

The AC breakdown test was done in the same manner as in Example 20. The results are shown in Table 12.

TABLE 11

| specimen | | rrrr | MFR (g/10 min) | Mw/Mn | ESC resistance | | YS (kg/cm$^2$) | | TS (kg/cm$^2$) | | Elo. (%) | |
|---|---|---|---|---|---|---|---|---|---|---|---|---|
| | | | | | 0° C. rapid cooling | gradual cooling | 0° C. rapid cooling | gradual cooling | 0° C. rapid cooling | gradual cooling | 0° C. rapid cooling | gradual cooling |
| Ex. 54 | s-PP | 0.80 | 8.90 | 2.4 | 0/10 | 0/10 | 122 | 144 | 340 | 295 | 656 | 569 |
| 55 | " | 0.84 | 0.50 | 2.5 | 0/10 | 0/10 | 198 | 214 | 374 | 405 | 500 | 573 |
| 56 | " | 0.86 | 0.63 | 6.1 | 0/10 | 0/10 | 200 | 249 | 380 | 246 | 593 | 533 |
| 57 | " | 0.89 | 0.34 | 5.5 | 0/10 | 0/10 | 207 | 227 | 372 | 407 | 523 | 562 |
| 58 | " | 0.91 | 1.20 | 2.2 | 0/10 | 0/10 | 187 | 262 | 419 | 438 | 520 | 558 |
| 59 | " | 0.93 | 2.30 | 2.3 | 0/10 | 0/10 | 148 | 244 | 502 | 407 | 538 | 540 |
| 60 | " | 0.94 | 1.20 | 2.2 | 0/10 | 0/10 | 158 | 278 | 482 | 445 | 507 | 547 |
| 61 | " | 0.95 | 14.00 | 2.2 | 0/10 | 0/10 | 149 | 303 | 426 | 330 | 563 | 278 |
| 62 | " | 0.94 | 1.20 | 2.2 | 0/10 | 0/10 | 160 | 280 | 485 | 485 | 520 | 560 |
| Co. Ex. 11 | s-PP | 0.60 | 1.20 | 2.4 | 0/10 | 0/10 | 8.0 | 7.0 | — | — | no break | no break |
| 12 | HDPE | — | 0.26 | 110 | 2/10 | 4/10 | 255 | 325 | 310 | 190 | 810 | 120 | rrrr: Syndiotactic pentad ratio
MFR: Melt flow rate
Mw: Weight average molecular weight
Mn: Number average molecular weight
YS, TS, Elo.: According to JIS K-7113

As is evident from Table 11, the sheets prepared using the coating compositions for protecting wires of the Examples had superior ESC resistance and physical properties.

PREPARATIVE EXAMPLE

Using the coating compositions for protecting wires prepared in the above-mentioned Examples, sheaths were formed by extrusion molding on cable conductors. The respective sheaths had electric properties, mechanical properties and physical properties necessary for protecting wires, and were superior in wire protecting effects.

As mentioned above, the composition for coating protecting wires of the present invention is superior in processability, and has high ESC resistance and superior mechanical properties. In addition, the composition for coating protecting wires of the present invention permits rapid cooling, thereby increasing molding-processing speed to result in improved production efficiency of sheath and jacket used for wire protection and reduced production costs. Consequently, a composition for coating protecting wires, which is superior in wire protection effects, can be provided at low costs.

EXAMPLES 63–70, COMPARATIVE EXAMPLE 13

Various s-PP having a syndiotactic pentad ratio of 0.8–0.95, as shown in Table 12, were continuously

TABLE 12

| specimen | | rrrr | MFR (g/10 min) | impulse breakdown voltage (kV/mm) | | AC breakdown voltage (kV/mm) | |
|---|---|---|---|---|---|---|---|
| | | | | RT | 90° C. | RT | 90° C. |
| Example 63 | s-PP | 0.80 | 8.90 | 265 | 220 | 72.5 | 60.4 |
| 64 | " | 0.84 | 0.50 | 260 | 216 | 76.6 | 62.1 |
| 65 | " | 0.86 | 0.63 | 270 | 226 | 74.5 | 61.5 |
| 66 | " | 0.89 | 0.34 | 295 | 242 | 75.8 | 63.1 |
| 67 | " | 0.91 | 1.20 | 274 | 228 | 74.0 | 62.1 |
| 68 | " | 0.93 | 2.30 | 295 | 246 | 78.0 | 66.5 |
| 69 | " | 0.94 | 1.20 | 285 | 235 | 77.4 | 65.0 |
| 70 | " | 0.95 | 14.00 | 265 | 220 | 76.8 | 64.0 |
| Comp. Ex. 13 | s-PP | — | — | 180 | 135 | 58.5 | 45.1 | rrrr: Syndiotactic pentad ratio
MFR: According to JIS K 6760

EXAMPLE 71

A wire-connecting structure comprising an EMJ or BJM insulator was produced from s-PP having a syndiotactic pentad ratio of 0.91 and an MFR of 1.20 g/10 min.

The obtained wire-connecting structure did not require crosslinking, so that the production time was shortened and the structure was free from any influence from the residual crosslinking agent.

EXAMPLE 72

An s-PP having a syndiotactic pentad ratio of 0.95 and an MFR of 14.0 g/10 min was processed into a tape (0.1 mm thickness and 20 mm width), and wound up into a predetermined shape. A die was set from the outside and the tape was heat-melted. The resultant tape was left standing for cooling without crosslinking to give a TMJ wire-connecting structure having an insulating layer thickness of 10 mm.

The wire-connecting structure did not require crosslinking, so that the production time was shortened by 3-4 hours and the molded product was not deformed or deshaped, achieving fine size precision.

EXAMPLE 73

A wire-connecting structure having a PJ insulator was produced from an s-PP having a syndiotactic pentad ratio of 0.89 and an MFR of 0.34 g/10 min.

The structure obtained had a 55% reduced weight in comparison with that wherein PJ is an epoxy resin.

The wire-connecting structures of the Examples have overcome the problems that the insulator of the conventional wire-connecting structures had, such as influence of residual crosslinking agent, cold flow, gap and heavy weight of the insulator, and affords superior electric properties.

What is claimed is:

1. An insulating layer of power cables formed from a composition comprising a syndiotactic polypropylene having a syndiotactic pentad ratio of not less than 0.7 and a melt flow rate of 0.1–20 g/10 min.

2. The insulating layer of claim 1, wherein the power cable is a low voltage power cable.

3. The insulating layer of claim 1, which is an insulating layer of a high voltage power cable comprising an insulating layer, and at least one of a non-crosslinked external semiconductor layer and a non-crosslinked internal semiconductor layer.

4. The insulating layer of claim 3, wherein the at least one of the non-crosslinked external semiconductor layer and the non-crosslinked internal semiconductor layer is formed from a mixture of a thermoplastic elastomer and a conductive substance.

5. A foamed insulator of a communication cable comprising a syndiotactic polypropylene having syndiotactic pentad ratio of not less than 0.7 and a melt flow rate of 0.1–20 g/10 min.

6. The insulating layer of claim 1, wherein the composition further comprises a flame retardant.

7. The article of claim 6, which is a flame-resistant layer of a flame-resistant cable.

8. The article of claim 7, wherein the flame-resistant layer is an insulating layer.

9. The article of claim 7, wherein the flame-resistant layer is an outermost layer.

10. The article of claim 1, which is a coating layer of an optical fiber.

11. The article of claim 10, wherein the coating layer is a primary layer.

12. The article of claim 10, wherein the coating layer is a jacket.

13. The article of claim 1, which is an insulator of a wire-connecting structure.

14. A sheath or a jacket of a power cable formed from a composition comprising a syndiotactic polypropylene having a syndiotactic pentad ratio of not less than 0.7 and a melt flow rate of 0.05–20 g/10 min, and at least one member selected from carbon black and pigments.

* * * * *